United States Patent [19]
Hicks, Sr.

[11] Patent Number: 5,630,293
[45] Date of Patent: May 20, 1997

[54] RHIZOME CLIP FOR ORCHID PLANTS AND THE LIKE

[76] Inventor: John T. Hicks, Sr., 11410 Judge Ave., Orlando, Fla. 32817-4407

[21] Appl. No.: 598,121

[22] Filed: Feb. 7, 1996

[51] Int. Cl.⁶ .................................................. A01G 9/04
[52] U.S. Cl. .................. 47/70; 47/84; 248/311.2
[58] Field of Search ............... 47/70, 84 R; 248/311.2 R

[56] References Cited

U.S. PATENT DOCUMENTS

| 11,622 | 7/1854 | Warren | 47/70 |
|---|---|---|---|
| 796,214 | 8/1905 | Hughes | 47/70 |
| 2,218,157 | 10/1940 | Seidel | 47/41 |
| 2,228,730 | 1/1941 | Pinnecker | 47/41 |
| 4,040,208 | 8/1977 | England | 47/67 |
| 4,270,310 | 6/1981 | Fischer | 47/70 |
| 5,263,279 | 11/1993 | Delsanne et al. | 47/70 |
| 5,347,752 | 9/1994 | Black | 47/41.11 |

FOREIGN PATENT DOCUMENTS

| 708625 | 7/1931 | France | 47/70 |
|---|---|---|---|
| 48531 | 9/1989 | Germany. | |
| 5551 | of 1893 | United Kingdom. | |
| 312540 | 5/1929 | United Kingdom | 47/70 |
| 1272942 | 5/1972 | United Kingdom | 47/70 |
| 2254767 | 10/1992 | United Kingdom | 47/70 |

*Primary Examiner*—Henry E. Raduazo
*Attorney, Agent, or Firm*—Edward M. Livingston, Esq.

[57] ABSTRACT

A device having a coiled section (13) and clip (12) attached over the rim of a pot (10) with an elongated stem (14) extending over and holding a plant in the pot. The coiled section (13) contains spring-like semi-circular loops and an outer vertical clip so that the rim of the pot fits between the loops and the clip for secure holding. An optional inward bending hook (15) may be further provided to hold the device under the bottom of the rim. Due to the spring-like expandability of the coiled section (13), the device can be easily used on plastic pots or any type of pot without modification.

8 Claims, 1 Drawing Sheet

RHIZOME CLIP FOR ORCHID PLANTS AND THE LIKE

BACKGROUND OF THE INVENTION

This invention relates to holders and anchors for plants for use during the early stages of growth, storage and transportation in pots and more particularly, to a clip to hold orchids and similar plants.

Many plants, particularly air plants like orchids, do not have strong root systems that will hold the plant in potting media during the early stages of growth or during storage and transportation. In such plants the roots grow from around an area around the base of the plant, called the "rhizome", and thus, do not sufficiently anchor the plants in the soil.

The most commonly used device currently on the market, which hereinafter is described and illustrated as the prior art, works properly on only clay pots, as clay pots have a thick rim around the top of the pot. However, in recent years clay pots, due to greater weight and expense, have been replaced by lighter, cheaper and more durable plastic pots which are now being used almost exclusively. As plastic pots have only a thin rim around the top of the pot, the prior art clip does not work on plastic pots unless it is bent or pinched. Although bending or pinching the prior art clip can be done by hand, it usually requires pliers. Due to the need for bending or pinching, more time is required, labor costs are increased and persons with arthritis or other infirmity involving the hands find it very difficult to use the prior art clip.

Thus, there is a need for a new and easy to use device that can hold and anchor orchid plants and the like in a plastic pot or any type of pot without any modification.

The prior patented art includes many holding and anchoring devices for plants, but none is similar to the present invention. The pertinent prior art includes the following patents:

| Patent No. (U.S. unless stated otherwise) | Inventor | Issue Date |
| --- | --- | --- |
| 4,040,208 | England | Aug. 9, 1977 |
| Great Britain 5551 | | Mar. 21, 1893 |
| German 48531 | | Sept. 2, 1889 |
| 5,347,752 | Black | Sep. 20, 1994 |
| 2,228,730 | Pinnecker | Jan. 14, 1941 |
| 4,270,310 | Fischer | June 2, 1981 |
| 5,263,279 | Delsanne, et al. | Nov. 23, 1993 |
| 2,218,157 | Seidel | Oct. 15, 1940 |

England teaches an orchid holder and anchor consisting of a "U"-shaped wire with two legs having hooks at the bottom of each leg to attach inside a plastic pot through holes in the bottom of said pot. A bridge portion of the "U"-shaped wire is used to support plants by a separate wire wrapped around the plant and the bridge portion. The Great Britain patent discloses a plant holder consisting of a bent wire with a loop at one end to encircle a plant and a bent end to hook over the edge of a pot. The German patent discloses various plant supports with various means of hooking them over the edge of a flower pot. The Black teaches a flower storage device with a grid supported on edges of a flower pot by wire hooks. The Pinnecker patent discloses a wire flower pot with clips on each end to attach it to the edges of a flower pot. The Fischer patent teaches yet another plant support device having wire hooks to attach to the edge of a pot and an opening to hold a support rod. The Delsanne, et al. patent teaches another plant support using a wire around a plant with the wire being attached to a vertical prop and horizontal slide secured to the edge of a pot by a sleeve on a spike. Finally, the Seidel patent teaches a floral pick with attached water container.

SUMMARY OF THE INVENTION

The objects of the present invention are to provide a device that:

holds and anchors plants, particularly air plants like orchids, in a potting media, such as soil, rock, bark and so forth, during the early stages of growth, storage or transportation;

is usable without modification even with a plastic pot;

does not require pinching or bending for use with a plastic pot or other pot with a thin rim; and can be used easily by anyone who may have arthritis or other infirmity of the hands.

The present invention fulfills the above and other objects by providing a device that has an elongated stem extending over and from a lower root portion of a plant to a coiled section attached to the rim of a pot. The coiled section has a vertical clip on an outer end so that the device can be removably attached to the rim of the pot by placing the device on the rim such that the rim of the pot fits between the coiled section and the vertical clip. The vertical clip may have a slight inward bending hook on the bottom such that it more securely attaches under the rim of the pot. The device would preferably be made of resilient material so that the coiled section acts as a coiled spring for even more secure holding to the rim of the pot. Although the coiled section could have any number of loops or twists, for simplicity and reduced costs of manufacturing, it would preferably have only two coiled loops, which provides sufficient tension to hold the device to the rim of the pot.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
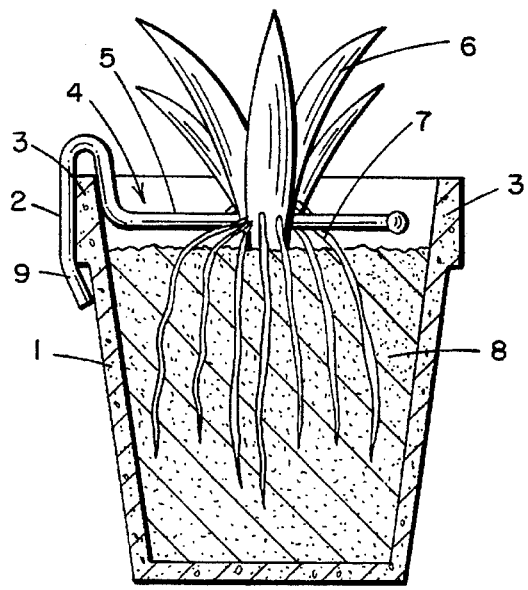
FIG. 1 is a side cutaway view showing the prior art clip in use on a pot.
Figure 2:
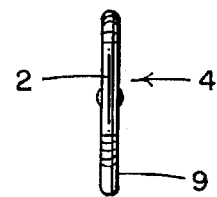
FIG. 2 is an end view of the prior art clip only.
Figure 3:
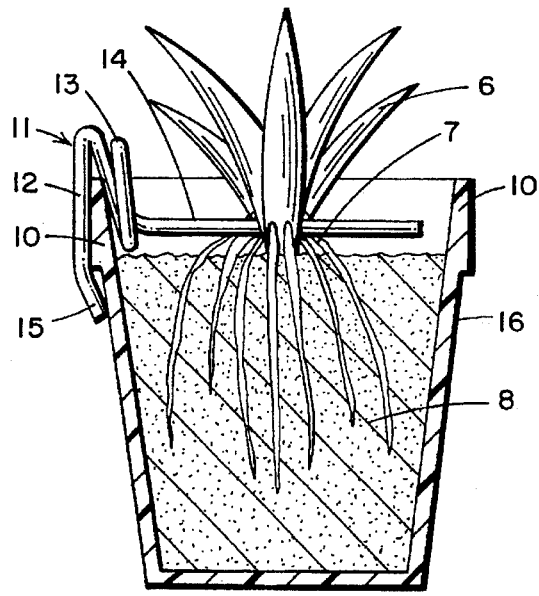
FIG. 3 is a side cutaway view of the rhizome clip of the present invention in use on a pot.

The rhizome clip of the present invention may be more easily understood by contrasting it to the prior art device illustrated in FIGS. 1 and 2 of the drawings. In FIG. 1, a clay pot 1 is shown containing potting media, such as soil, rocks, bark and so forth, and an orchid plant 6 with the rhizome of the plant. The prior art clip 4 is shown having a stem portion 5 extending over the rhizome of the plant from a rim clip 2 attached over the rim 3 of the clay pot 1. The prior art device also contains a hook end 9 which secures it under the rim 3 on the pot 1. The end view of the prior art clip in FIG. 2 shows that it is merely a two-dimensional elongated piece. Unfortunately, the prior art clip requires pliers to squeeze the clips on pots having a thin rim because it does not provide sufficient tension on the rim of the pot to hold it in place. If it is used as is, it would come off the pot resulting in the plant falling out of the pot. Thus, using the prior art clip increases labor costs due to the time necessary to bend the clip.

By contrast, the clip of the present invention depicted as numeral 11 in FIGS. 3, 4, 5, 6 and 7, has an elongated stem portion 14 and a coiled spring section 13. The coiled spring section 13 has a vertical rim clip 12 which enables the rim 10 of the pot 16 to be sandwiched between the vertical clip 12 and the coiled spring section 13. The coiled spring portion 13 has sufficient resiliency so that the space between the rim clip 12 and coiled spring 13 expands when the clip is pushed vertically downward over the rim of any pot, including one with a wider rim, such as a clay pot. Thus, the rhizome clip 11 of the present invention can be used on any pot.

The rhizome clip of the present invention 11 may also contain a slight inward bend or hook 15 at the bottom of the vertical clip 12 to attach it under the bottom of the rim 10 of a pot 16 for even more secure holding of the clip to a pot. However, a hook 15 is not necessary as the coiled spring section 13 provides sufficient tension to hold the clip securely to the pot in most cases.

Figure 4:
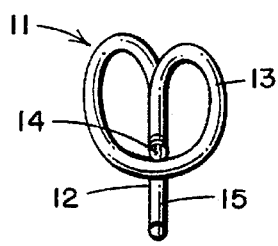
FIG. 4 is an end view of the rhizome clip of the present invention.
Figure 5:
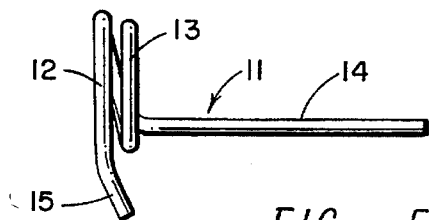
FIG. 5 is a side view of the rhizome clip of the present invention.
Figure 6:
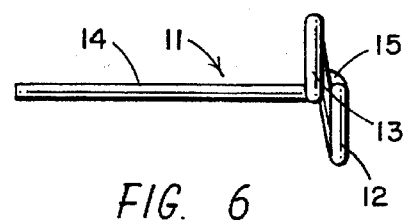
FIG. 6 is a top view of the rhizome clip of the present invention.
Figure 7:
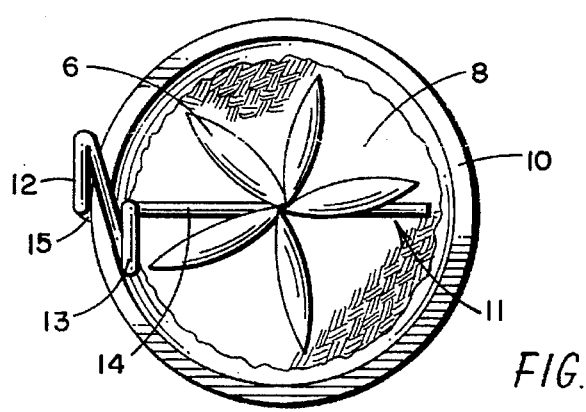
FIG. 7 is a top view of the rhizome clip of the present invention in use on a pot.

The coiled spring section 13 could have many coils in it, although for increased ease and reduced cost of manufacture, it would preferably have just two coils as illustrated in FIG. 4 with the vertical clip on the outside in the center of the two semi-circular coils.

The rhizome clip of the present invention is preferably made of one piece of metal wire which has some resiliency to it so that the coiled section 13 acts like a spring.

Although only a few embodiments of the present invention have been described in detail hereinabove, all improvements and modifications to this invention within the scope or equivalents of the claims are covered by this invention.

Having thus described my invention, I claim:

1. A clip device having a coiled section and an elongated stem portion adapted to support a rhizomatous orchid in the center of a pot having a predetermined diameter, said elongated stem having a length sufficient to extend over the center of said pre-determined diameter once said coiled section is attached to the rim of said pot and wherein the coiled section of the device has two adjacent semi-circular coils and a vertical rim clip at an outer end of said coiled section so that the device can be removably attached to the rim of the pot by placing the coiled section over the rim such that the rim of the pot fits between the coiled section and the vertical rim clip.

2. The device of claim 1 wherein the vertical rim clip on the coiled section has a slight inward bending hook on a bottom end to further secure the device to the rim of the pot.

3. The device of claim 1 wherein the coiled section is resilient such that the coiled section acts like a spring to securely hold the device to the rim of the pot.

4. The device of claim 2 wherein the coiled section is resilient such that the coiled section acts like a spring to securely hold the device to the rim of the pot.

5. The device of claim 1 wherein the coiled section has the vertical rim clip on an outside center of the loops.

6. The device of claim 2 wherein the coiled section has the vertical rim clip on an outside center of the loops.

7. The device of claim 3 wherein the coiled section has the vertical rim clip on an outside center of the loops.

8. The device of claim 4 wherein the coiled section has the vertical rim clip on an outside center of the loops.

* * * * *